United States Patent [19]

Kidoh et al.

[11] 4,032,497

[45] June 28, 1977

[54] METHOD AND APPARATUS FOR REMOVAL OF UNREACTED MONOMER FROM SYNTHESIZED HIGH POLYMER LATEX

[75] Inventors: Kunizoh Kidoh; Hideki Wakamori; Kamizo Iimura, all of Iwaki, Japan

[73] Assignee: Kureha Kagaku Kogyo Kabushiki Kaisha, Tokyo, Japan

[22] Filed: July 15, 1975

[21] Appl. No.: 596,062

[30] Foreign Application Priority Data

July 19, 1974 Japan .............................. 49-83676

[52] U.S. Cl. .................. 260/29.6 R; 260/29.6 PT; 260/29.7 R; 260/29.7 PT
[51] Int. Cl.² ....................................... C08L 27/06
[58] Field of Search ............... 260/29.6 PT, 29.6 R, 260/29.7 PT, 29.7 R; 528/483; 55/54, 47, 37; 210/188, 218

[56] References Cited

UNITED STATES PATENTS

| | | | |
|---|---|---|---|
| 2,451,332 | 10/1948 | Green | 260/29.7 PT |
| 2,804,172 | 8/1957 | Sender | 55/54 |
| 3,052,645 | 9/1962 | Denson | 260/29.7 PT |
| 3,129,132 | 4/1964 | Gudheim | 159/49 |
| 3,371,059 | 2/1968 | Rich | 260/29.6 PT |

FOREIGN PATENTS OR APPLICATIONS

262,382  5/1970  U.S.S.R. ..................... 260/29.6 PT

*Primary Examiner*—M. J. Welsh
*Attorney, Agent, or Firm*—Lane, Aitken, Dunner & Ziems

[57] ABSTRACT

From a synthesized high polymer latex, the unreacted monomer remaining therein can be removed efficiently by causing a hollow cylinder inclined by a gradient of 1/100 to 1/10 with reference to the horizontal plane to be rotated around its axis, then introducing the synthesized high polymer latex and a gas containing moisture into the interior of the hollow cylinder which is maintained in continuous rotation and allowing the latex and the gas to come into mutual contact within the hollow cylinder.

8 Claims, 3 Drawing Figures

METHOD AND APPARATUS FOR REMOVAL OF UNREACTED MONOMER FROM SYNTHESIZED HIGH POLYMER LATEX

FIELD OF THE INVENTION

The present invention relates to a method and apparatus for effective removal of an unreacted monomer from a synthesized high polymer latex containing the unreacted monomer.

BACKGROUND OF THE INVENTION

Synthesized high polymer latexes are extensively used. If a given latex happens to contain an unreacted monomer, the odor, toxicity and other adverse factors due to the presence of the unreacted monomer pose a serious problem from a hygienic point of view. Particularly, when the latex is used as the raw material for food packages or as the raw material for products destined to come into direct contact with the human body, it is important that the latex be free from residual unreacted monomer. It becomes necessary, therefore, that such a latex be separated from the residual unreacted monomer.

Various methods have heretofore been proposed for the removal of unreacted monomer from the latex. In one prior method nitrogen, air or some other similar gas is directly blown into the latex. Another prior method employs an agitated thin film evaporator and another utilized a packed column. The method which involves direct contact between nitrogen, air and the latex, however, is undesirable in that the treatment is time-consuming and removal of the unreacted monomer is difficult to accomplish and therefore, the efficiency of the operation of removal is low. The method which involves use of an agitated thin film evaporator requires forced formation of a film of latex by means of agitation and therefore, tends to induce coagulation of latex and vigorous growth of bubbles in the latex. In the method which resorts to the use of a packed column, solid components contained in the latex tend to separate and deposit, for example, on the inner wall surface of the column and on the surface of packing in the column possibly because of nonuniformity in the of wetting of the column interior by the latex, and the column itself is extremely difficult to clean which is required for maintenance. Thus, none of the methods mentioned above prove satisfactory. In addition to the methods described above, various other methods have been developed in accordance with particular application in which the latex is to be used. When a latex is used as a coating agent, for example, the removal of residual unreacted monomer is effected by vaporizing the unreacted monomer while the coating film of latex is being dried. When a latex is treated so as to separate and recover solid components from the latex which are used in the form of a powder, the removal of unreacted monomer can be accomplished by desiccating the solid components after their recovery from the latex. Frequently, such drying treatments fail to provide thorough removal of the unreacted monomer. Moreover, these treatments in many cases involve hygienically undesirable phenomena such as emanation of an objectionable odor.

As described above, various methods have been adopted to date for the removal of unreacted monomers from latexes. By these methods, however, thorough removal of unreacted monomers from latexes can not always be accomplished satisfactorily even from an economical point of view. Moreover, the present state of technology does not enable such unreacted monomers to be thoroughly recovered and put to reuse.

SUMMARY OF THE INVENTION

It is, therefore, an object of the present invention to provide a novel method for efficient removal of unreacted monomer from a synthesized high polymer latex. Another object of the present invention is to provide an apparatus adapted to effect the method.

These and other objects of the present invention will become apparent from the following description of the invention. It has now been discovered that efficient removal of unreacted monomer from the latex can be accomplished by using a rotatable hollow cylinder inclined by a specified gradient with reference to the horizontal plane to and, continuously introducing the latex downwardly from the upper end of the cylinder into the rotating interior and simultaneously introducing a gas containing moisture continuously into the interior of the cylinder either countercurrently or cocurrently and bringing the latex and the gas into mutual contact inside the cylinder.

Thus, the method for the removal of the unreacted monomer from the latex according to the present invention, is characterized by the steps of continuously introducing the latex downwardly from the upper end into the interior of a hollow cylinder which is inclined by a gradient of 1/100 to 1/10 with reference to the horizontal plane and rotated around its axis, introducing a gas containing moisture into the interior of the cylinder simultaneously with the introduction of the latex either countercurrently or cocurrently relative to the flow of the latex and bringing the latex and the gas into mutual contact therein. The apparatus of the present invention used for practicing the method includes a hollow cylinder, mounted for rotation about its axis and inclined by a gradient of 1/100 to 1/10 with reference to the horizontal plane, and provided, at the upper end thereof, with an inlet for the latex and an outlet or inlet for the gas and, at the lower end thereof, with an outlet for the latex and an inlet or outlet for the gas, respectively.

DETAILED DESCRIPTION OF THE INVENTION

The present invention will be described more specifically by reference to the preferred embodiment of the apparatus of the present invention illustrates in the accompanying drawings.

Figure 1:
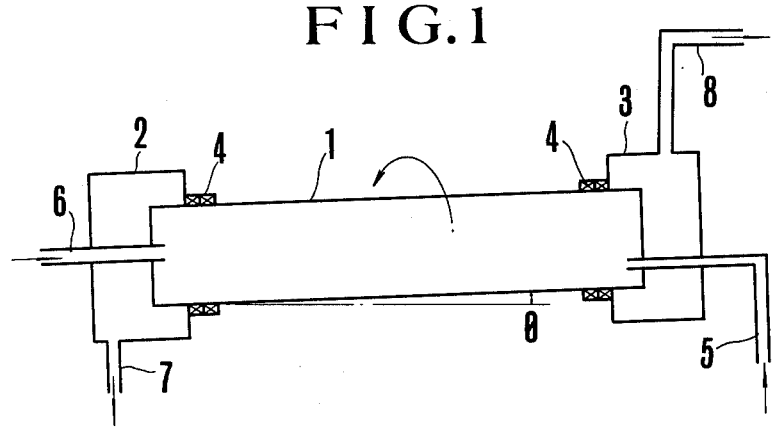
FIG. 1 is a schematic diagram illustrating one preferred embodiment of the apparatus of the present invention.

FIG. 1 is a general explanatory diagram illustrating one preferred embodiment of the apparatus according to the present invention (with the detailed mechanism and accessorial items excluded). This apparatus include a hollow cylinder 1 which is made of stainless steel or glass, or composed of a steed shell lined with glass or synthetic resin. This hollow cylinder 1 is held in position by having its opposed ends fastened with covers 2 and 3 and gland packings 4 and 4' in such way that the cylinder is inclined by a gradient (tan θ) of 1/100 to 1/10 with reference to the horizontal plane and rotated around its axis. The covers 2 and 3 primarily serve purpose of sealing the interior of the hollow cylinder against possible invasion by the atmospheric air. The gland packings 4 and 4' are intended to be interposed between the cylinder 1 and the covers 2 and 3 to form a seal therebetween. In the upper end of the hollow cylinder 1 is provided a latex-introducing pipe 5 which communicates with the interior of the cylinder 1 via a latex inlet port (not illustrated) bored in the upper end. A gas-discharging pipe 8 communicates with the interior of the cylinder 1 via a gas outlet port (not illustrated) bored in the upper portion of cover 3. At the lower end of the hollow cylinder 1, a gas-delivering pipe 6 communicates with interior of the cylinder 1 via a gas inlet port (not illustrated) bored in the lower end is provided. In the cover 2, a latex-withdrawing pipe 7 which communicates with the interior of the cylinder 1 via a latex outlet port (not illustrated) bored in the lower end of the cylinder 1.

Figure 2:
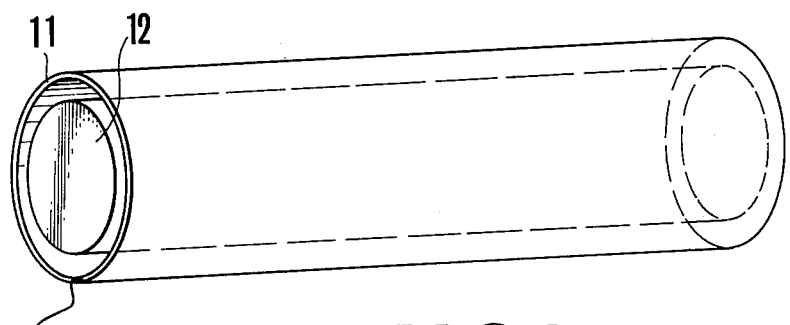
FIG. 2 is a perspective view of one preferred embodiment of the hollow cylinder for use in the apparatus according to the present invention.
Figure 3:
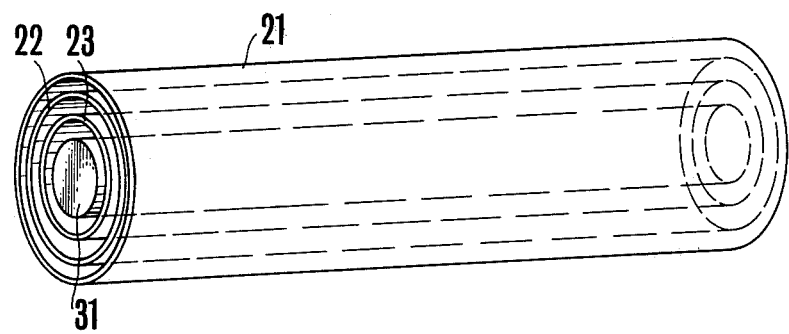
FIG. 3 is a perspective view of another preferred embodiment of the hollow cylinder for use in the apparatus.

Treatment of a synthesized high polymer latex containing an unreacted monomer by use of the apparatus of the present invention is accomplished by continuously introducing the latex via latex-introducing pipe 5 into the interior of the cylinder 1 and, at the same time, continuously introducing a moisturecontaining gas via the gas-delivering pipe 6 into the interior of the cylinder 1 to cause the latex and the gas to come into counterflow contact while continuously rotating the hollow cylinder 1 around its axis. The latex may properly be heated, as required, by means of a pre-heater (not illustrated) and thereafter introduced in a heated state into the interior of the hollow cylinder 1. It is essential that the gas contains moisture a gas containing no moisture, when brought into contact with the latex, could possibly concentrate or dry the latex, or cause the latex to form a film or separate phase. The gas, therefore, is preferred to be of a type such that at the temperature at which it is introduced into the interior of the hollow cylinder 1, it is fully saturated with moisture or it is saturated to a humidity of not less than 90%. For example, one member or a mixture of two or more members selected from the group consisting of air saturated with moisture and nitrogen saturated with moisture, and saturated steam may be used effectively. The gradient (tan θ) with which the hollow cylinder 1 is inclined with reference to the horizontal plane is required to be not less than 1/100 so that the latex introduced will flow smoothly down the interior of the cylinder 1. When the gradient exceeds 1/10, however, the rate at which the latex flows down increases too much to permit satisfactory removal of the unreacted monomer from the latex. The gradient, therefore, is required to fall in the range of from 1/100 to 1/10. For more effective removal of the unreacted monomer from the latex, due attention should be paid to the rate at which the hollow cylinder 1 is rotated around its axis. To be specific, the unreacted monomer is removed efficiently from the latex when the hollow cylinder 1 is so rotated that the latex introduced into the interior of the cylinder 1 is not caused, by the centrifugal force, to rotate with the barrel of the cylinder 1 but is suitably dispersed and caused to flow along the inner wall surface of the cylinder 1. The selection of a suitable rate of rotation is not easy, for the condition of flow of the latex inside the interior of the hollow cylinder 1 is affected by the size and gradient of the cylinder 1, the properties of the latex such as density and viscosity, the flow volume of the latex and other factors. Through experiments, we have confirmed that in an operation in which an ordinary synthesized high polymer latex is treated by introduction at a given delivery rate, F ($m^3$/hr), into the interior of a hollow cylinder 1 measuring D (m) in diameter and L (m) in inner circumference and inclined by a gradient of 3/100, the optimum rotation number N (rpm) of the cylinder 1 roughly falls within the range of $\sqrt{5,000/D} \times (1\pm0.3)$ and the removal of the unreacted monomer consequently proceeds most efficiently when the ratio F/L has a value in the neighborhood of 0.13. For the purpose of the present invention, therefore, the rate of rotation may preferably be selected, considering the range as the standard. Furthermore, the ease with which the unreacted monomer is removed from the latex heavily hinges on the rate at which the gas is introduced via the gas-delivering pipe 6 into the interior of the hollow cylinder 1. Where the efficiency of the removal of the unreacted monomer is preferred to be increased without increasing the volume of the gas being used, therefore, in place of the hollow cylinder 1, a hollow cylinder 11 which has its central space a round column 12 disposed inside as illustrated in FIG. 2. may be used. In this case, the distance between the inner surface of the hollow cylinder 11 and the outer surface of the round column 12 may be about 3 to 60 mm, preferably 10 to 40 mm when the cylinder 11 has a diameter of not less than 20cm. It should be noted that the effect of the incorporation of the round column 12 cannot be expected where the distance is greater than the upper limit 60 mm of the range. The amount of latex capable of treatment in a single apparatus can be increased by using, in the place of the hollow cylinder 1, a hollow cylinder 21 wherein one or more tubes 22, 23, . . . are concentrically inserted and fixed in position relative to the cylinder 21 and a round column 31 is disposed within and fills the central space of the cylinder as shown in FIG. 3, introducing the latex subjected to treatment into the annular spaces formed inside the cylinder 21 by tubes 22, 23, . . . and round column 31 and, at the same time, introducting the moisture-containing gas. Also in this case, the wall-to-wall distances in the spaces may be about 3 to 60 mm each. Of the tubes 22, 23, . . . , those on the inside naturally have smaller diameters than those on the outside. Despite such varying diameters, uniform removal of the unreacted monomer can be obtained by properly varying the amounts of latex and moisture-containing gas being introduced into the different spaces.

When the latex is brought into contact with the moisture-containing gas in the interior of the hollow cylinder 1 as described above, the unreacted monomer is removed substantially completely from the latex without coagulation of the latex. The latex now free from the residual monomer is recovered via the latex-withdrawing pipe 7 and then cooled as required. After the contact, the gas advances through the interior of the hollow cylinder 1 eventually to be led into a condenser or a suitable collector or effluent treating device (not illustrated).

In the present invention, the latex and the gas are usually contacted countercurrently as described above for efficient removal of the unreacted monomer. The latex and the gas may otherwise be brought into contact cocurrently, depending on the particular type of latex to be treated. In this case, the parallel-flow contact of the two fluids can be accomplished by using the gas-discharging pipe 8 as a gas-delivering pipe and the gas-delivering pipe 6 as a gas-discharging pipe, respectively, in the apparatus of FIG. 1 so as to reverse the direction in which the gas is introduced into the interior of the hollow cylinder 1.

In the present invention, the efficiency of the removal of the unreacted monomer from the latex increases with increasing temperature of the latex inside the apparatus. This means that the temperature of the gas used and the temperature of the latex subjected to treatment are preferred to be as high as permissible. Since some latexes are thermally unstable elevated temperatures could possibly give rise to such undesirable phenomena as formation of a coagulum and degradation of product quality, or induce growth of bubbles. According it is preferable that the temperatures be determined with due consideration paid to the particular type of latex to be subjected to treatment. When the latex is of a type capable of withstanding a temperature of about 100° C, for example, saturated steam at a temperature of about 100° C may be used as the moisture-containing gas. Where a mixture of saturated steam with air or nitrogen, is used the temperature of this mixture can be adjusted to varying degrees of temperature below 100° C be properly changing the mixing ratio of the components. When the latex happens to be of a type incapable of withstanding a temperature of about 100° c, therefore, such a mixture can be used effectively as the moisture-containing gas. The latex subjected to the treatment may be preheated. For this pre-heating, there is used an ordinary multitube heat exchanger using hot water or some other heat medium, a jacketed agitator or other similar heat exchanger, or a dielectriic heater utilizing high-frequency waves. When the latex is thus preheated and then introduced into the apparatus of the present invention, possible dilution of the resin concentration of the latex due to condensation of moisture in the gas can be reduced.

The synthesized high polymer latexes to which the present invention can be applied include those polymers, copolymers and graft polymers which are obtained by the emulsion polymerization of monomers in aqueous media by using one or more surface active agents selected from the group consisting of anionic surface active agents such as potassium oleate, sodium alkylbenzene-sulfonate and sodium alkylsulfate and nonionic surface active agents such as polyoxyethylene alkylethers, polyoxyethylene alkylesters and polyoxyethylene sorbitan alkylesters in the presence of a water-soluble radical catalyst such as hydrogen peroxide, an alkali salt of persulfate, an azo compound or an organic hydroperoxide or so-called redox type catalyst prepared by adding to the water-soluble radical catalyst a reducing agent and a salt of a transition metal in minute amounts. Examples of the monomers usable for the preparation of the latexes include vinyl chloride, vinyl acetate, vinylidene chloride, vinyl trifluorochloride, acrylonitrile, methacrylonitrile, acrylic esters, methacrylic esters, acrylic acid, itaconic acid, maleic anhydride, styrene, butadiene, chloroprene and isoprine. The latexes may be used either singly or in the form of a mixture consisting of two or more members.

The present invention will be described more specifically with reference to working examples. It should be noted, however, that the present invention is not limited to these examples.

EXAMPLE 1

In an apparatus having a hollow cylinder inclined by a gradient of 3/100 with reference to the horizontal plane, measuring 10 cm in diameter and 4 m in length and rotated at a rate of 200 rpm, an acrylonitrile-methyl acrylate copolymer latex having a resin content of 31%, obtained by polymerization with sodium alkylbenzenesulfonate used as the emulsifier and containing 1.5% of acrylonitrile and 0.8% of methyl acrylate as unreacted monomers was introduced at a rate of 42 liters/hour and steam was introduced countercurrently at a rate of 21 kg/hour. Consequently, the unreacted monomers in the latex were decreased to 30 ppm of acrylonitrile and 10 ppm of methyl acrylate. After the operation was continued for ten hours, no adhesion of resin was observed on the inner wall surface of the hollow cylinder. Nor was there observed any growth of bubbles during the operation.

EXAMPLE 2

In an apparatus wherein a hollow cylinder inclined by a gradient of 3/100 with reference to the horizontal plane and measuring 50 cm in diameter and 4 m in length had its inner space occupied a solid cylinder measuring 45 cm in diameter and 3.5 m in length and the hollow cylinder was rotated at a rate of 100 rpm, a vinyl chloride-vinylidene chloride copolymer latex having a resin content of 50%, obtained by emulsion polymerization with sodium alkylbenzenesulfonate used as the emulsifier and containing 1,500 pm of vinyl chloride and 100 ppm of vinylidene chloride as unreacted monomers was supplied at a rate of 200 liters/hour and nitrogen gas saturated at 70° C with moisture was delivered at a rate of 60 kg/hour. Consequently, the unreacted monomers in the latex were decreased to 0.8 ppm of vinyl chloride and 0.1 ppm of vinylidene chloride, respectively.

After the operation was continued for 10 hours, no adhesion of resin was observed on the inner wall surface of the hollow cylinder, nor was there observed any growth of bubbles during this operation.

EXAMPLE 3

In an apparatus wherein two concentric hollow cylinders inclined by a gradient of 3/100 with reference to the horizontal plane and measuring 50 cm and 45 cm in diameter and 4 m in length with the central space occupied by a solid cylinder measuring 40 cm in diameter and 3.5 m in length, a latex was treated to remove therefrom unreacted monomers by rotating the cylinder at a rate of 100 rpm. The latex used in this case was a butadiene-methyl methacrylate-styrene graft polymer latex having a resin content of 32%, obtained by polymerization with potassium oleate used as the emulsifier and containing 0.23% of methyl methacrylate and 0.033% of styrene as unreacted monomers. This emulsion was supplied to the outer cylinder at a rate of 180 liters/hour and to the inner cylinder at a rate of 150 liters/hour, respectively, while steam was delivered at a rate of 150 kg/hour. Consequently, the unreacted monomers in the latex were decreased to 10 ppm of methyl methacrylate and 70 ppm of styrene, respectively. After this operation was continued for ten hours, no adhesion of resin was observed on the inner wall surface of the hollow cylinder. Nor was there observed any growth of bubbles during this operation.

EXAMPLE 4

In an apparatus wherein a hollow cylinder inclined by a gradient of 3/100 with reference to the horizontal plane and measuring 50 cm in diameter and 4 m in length had its central space occupied by a solid cylinder measuring 45 cm in diameter and 3.5 m in length and the cylinder was rotated at a rate of 90 rpm, a vinyl chloride-vinylidene chloride copolymer latex having a resin content of 50%, obtained by polymerization with sodium alkylbenzenesulfonate used as the emulsifier and containing 1,000 ppm of vinyl chloride and 2,000 ppm of vinylidene chloride as unreacted monomers was heated to 70° C with a multi-tube heat exchanger using hot water as the heat medium and supplied at a rate of 250 liters/hour and, at the same time, steam delivered at a rate of 120 kg/hour was mixed with air of room temperature and introduced at the resultant temperature of 98° C. Consequently, the unreacted monomers in the latex were decreased to less then 0.1 ppm of vinyl chloride and 0.2 ppm of vinylidene chloride, respectively. After the operation was continued for 200 hours, only a slight degree of resin adhesion was observed on the inner wall surface of the cylinder. No growth of bubbles was observed, however, in the course of this operation. At the end of the operation, the resin content of the latex was found to be 47%.

What is claimed is:

1. A method for the removal of unreacted monomers from a polymer latex comprising:
   providing a hollow cylinder inclined at a gradient of 1/100 to 1/10 with respect to the horizontal plane;
   rotating said hollow cylinder;
   introducing the polymer latex into the top of said rotating cylinder; and
   introducing a moisture-containing gas into said rotating cylinder for contact with the latex.
2. The method of claim 1 wherein said gas has a humidity of at least 90%.
3. The method of claim 1 wherein said gas is saturated with moisture.
4. The method of claim 1 wherein said gas is selected from the group consisting of air, nitrogen, steam, and mixtures thereof.
5. The method of claim 1 wherein said hollow cylinder has at least one tube disposed concentrically therein so as to form at least two passages and wherein the gas is introduced into one of said passages at a first rate and into a second of said passages at a second rate.
6. The latex obtained by the method of claim 1.
7. The method of claim 1 wherein said polymer latex is formed by emulsion polymerization of monomers in an aqueous media.
8. The process of claim 7 wherein said monomer is selected from the group consisting of vinyl chloride, vinyl acetate, vinylidene chloride, vinyl trifluorochloride, acrylonitrile, methacrylonitrile, acrylic esters, methacrylic esters, acrylic acid, itaconic acid, maleic anhydride, styrene, butadiene, chloroprene, isoprene and mixtures thereof.

* * * * *

UNITED STATES PATENT OFFICE
CERTIFICATE OF CORRECTION

Patent No. 4,032,497  Dated June 28, 1977

Inventor(s) Kunizoh Kodoh

It is certified that error appears in the above-identified patent and that said Letters Patent are hereby corrected as shown below:

Column 1, line 44, delete "of" (second occurrence).

Column 2, line 18, delete "to";

line 19, before "cylinder" insert --rotating--;

line 20, delete "rotating" before "interior".

Column 3, line 7, after "serve" insert --the--;

line 19, after "with" insert --the--;

line 20, after "end" insert a period (.);

line 21, delete "is provided.";

line 21, after "cover 2," insert --is provided--;

line 38, after "moisture" insert --because--.

Column 4, line 27, change "a round" to --around--;

line 46, change "introducting" to --introducing--.

Column 5, line 20, change "According" to --Accordingly--;

line 29, change "be" to --by--;

line 32, change "100°c" to --100°C--;

line 38, change "dielectriic" to --dielectric--;

UNITED STATES PATENT OFFICE
CERTIFICATE OF CORRECTION

Patent No. 4,032,497          Dated June 28, 1977

Inventor(s) Kunizoh Kodoh

It is certified that error appears in the above-identified patent and that said Letters Patent are hereby corrected as shown below:

Column 6, line 27 after "occupied" insert --by--;

line 34, change "pm" to --ppm--;

Signed and Sealed this

Eleventh Day of October 1977

[SEAL]

Attest:

RUTH C. MASON  
*Attesting Officer*

LUTRELLE F. PARKER  
*Acting Commissioner of Patents and Trademarks*